US009353636B2

United States Patent
Dorow et al.

(10) Patent No.: US 9,353,636 B2
(45) Date of Patent: May 31, 2016

(54) PROCESS FOR REPLACING A BOLTED-ON NOZZLE BLOCK COUPLED TO A NOZZLE CHAMBER IN A STEAM TURBINE

(71) Applicants: James W. Dorow, Orlando, FL (US); Zachary D. Dyer, Orlando, FL (US); George C. Altland, Oviedo, FL (US)

(72) Inventors: James W. Dorow, Orlando, FL (US); Zachary D. Dyer, Orlando, FL (US); George C. Altland, Oviedo, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 473 days.

(21) Appl. No.: 13/911,146

(22) Filed: Jun. 6, 2013

(65) Prior Publication Data

US 2014/0363281 A1   Dec. 11, 2014

(51) Int. Cl.
  *F01D 9/04*   (2006.01)
  *F01D 25/14*   (2006.01)
  *B23P 6/00*   (2006.01)
  *F01D 25/24*   (2006.01)

(52) U.S. Cl.
  CPC *F01D 9/04* (2013.01); *F01D 9/042* (2013.01); *F01D 9/047* (2013.01); *F01D 25/246* (2013.01); *B23P 6/002* (2013.01); *F05D 2220/72* (2013.01); *Y10T 29/4973* (2015.01); *Y10T 29/49318* (2015.01); *Y10T 29/49668* (2015.01); *Y10T 29/49723* (2015.01); *Y10T 29/49737* (2015.01); *Y10T 29/49741* (2015.01)

(58) Field of Classification Search
  CPC ........... F01D 1/04; F01D 9/041; F01D 9/042; F01D 9/044; F01D 9/047; F01D 9/048; F01D 9/04; F01D 25/246; F05D 2230/70; F05D 2230/80; B23P 6/002; Y10T 29/49318; Y10T 29/49968; Y10T 29/49723; Y10T 29/49737; Y10T 29/49741; Y10T 29/4973
  USPC ........ 415/185, 202, 183, 208.2, 209.2–209.4, 415/210.1, 215.1, 191, 189–190
  See application file for complete search history.

(56) References Cited

U.S. PATENT DOCUMENTS

| | | | | |
|---|---|---|---|---|
| 1,118,352 | A * | 11/1914 | Junggren | F01D 9/042 415/194 |
| 1,154,777 | A * | 9/1915 | Kieser | F01D 25/246 415/138 |
| 4,362,464 | A * | 12/1982 | Stock | F01D 25/26 415/108 |
| 5,259,727 | A * | 11/1993 | Quinn | B23P 6/005 29/402.08 |
| 5,392,513 | A * | 2/1995 | Mazzola | B23P 6/005 228/119 |
| 6,964,554 | B2 | 11/2005 | Groenendaal et al. | |
| 7,954,323 | B2 | 6/2011 | Bellows et al. | |
| 2004/0101410 | A1 | 5/2004 | Naljotov et al. | |
| 2011/0158819 | A1 | 6/2011 | Mani et al. | |

* cited by examiner

*Primary Examiner* — Christopher Verdier

(57) ABSTRACT

A process is provided for replacing a first nozzle block coupled to a nozzle chamber with a second nozzle block. The process may comprise removing the first nozzle block from the nozzle chamber. The nozzle chamber may comprise a main body having at least one inlet, at least one passage and at least one exit. The process may further comprise coupling inner and outer retaining rings to the nozzle chamber main body; engaging a second nozzle block with the inner and outer retaining rings; forming a bore so as to extend partly in one of the inner and outer retaining rings and the second nozzle block; and locating an anti-rotation pin in the bore.

9 Claims, 6 Drawing Sheets

PROCESS FOR REPLACING A BOLTED-ON NOZZLE BLOCK COUPLED TO A NOZZLE CHAMBER IN A STEAM TURBINE

FIELD OF THE INVENTION

The present invention relates to a nozzle chamber and nozzle block structure in a steam turbine and, further, to a process for replacing a nozzle block bolted to a nozzle chamber with a slide-in design.

BACKGROUND OF THE INVENTION

A high pressure section in a steam turbine of a partial-arc machine may comprise a nozzle chamber for directing steam at a high temperature and pressure from a main steam inlet piping structure into a blade path at various arcs of admission. A nozzle block is often bolted to the nozzle chamber and comprises a plurality of circumferentially spaced apart vanes for directing the flow of steam passing from the nozzle chamber to a first row of rotating blades located downstream from the nozzle block. Due to stress corrosion and high cycle fatigue cracking, the bolts coupling the nozzle block to the nozzle chamber may fail.

SUMMARY OF THE INVENTION

In accordance with a first aspect of the present invention, a nozzle chamber and nozzle block structure for a steam turbine is provided comprising: a nozzle chamber; a slide-in nozzle block and at least one anti-rotation pin. The nozzle chamber may comprise a main body having at least one inlet, at least one passage and at least one exit, an inner retaining ring coupled to the main body and an outer retaining ring coupled to the main body. The at least one exit is located between the inner and outer retaining rings. The slide-in nozzle block may be coupled to the nozzle chamber by engaging grooves formed at least in part by the inner and outer retaining rings. The at least one anti-rotation pin may be positioned in a bore formed partly in one of the inner and outer retaining rings and the nozzle block.

The nozzle chamber main body may comprise a plurality of separate passages spaced-apart from one another circumferentially about the main body.

The nozzle block may comprise a support structure comprising a passageway for receiving steam from the at least one passage; and a plurality of vanes located within the passageway for directing the flow of steam moving through the passageway.

The nozzle block support structure may comprise an inner flange and an outer flange. The grooves formed at least in part by the inner and outer retaining rings may comprise an inner groove defined by the main body and the inner retaining ring and an outer groove defined by the main body and the outer retaining ring. The inner flange may engage the inner groove and the outer flange may engage the outer groove.

The at least one anti-rotation pin may comprise at least one inner anti-rotation pin positioned in a bore formed partly in the inner retaining ring and the nozzle block and at least one outer anti-rotation pin positioned in a bore formed partly in the outer retaining ring and the nozzle block.

The inner and outer retaining rings may be welded to the main body.

In accordance with a second aspect of the present invention, a process is provided for replacing a first nozzle block coupled to a nozzle chamber with a second nozzle block. The process may comprise removing the first nozzle block from the nozzle chamber. The nozzle chamber may comprise a main body having at least one inlet, at least one passage and at least one exit. The process may further comprise coupling inner and outer retaining rings to the nozzle chamber main body; engaging a second nozzle block with the inner and outer retaining rings so as to couple the second nozzle block to the nozzle chamber main body; forming a bore so as to extend partly in one of the inner and outer retaining rings and the second nozzle block; and locating an anti-rotation pin in the bore.

Removing may comprise removing bolts coupling the first nozzle block to the nozzle chamber.

The process may further comprise providing plugs in existing bolt holes in the nozzle chamber main body and securing these plugs via welding.

The process may further comprise machining an outer face of the nozzle chamber main body, wherein removing occurs before plugging and plugging occurs before machining.

Machining may further comprise removing existing outer securing hooks on the nozzle chamber main body.

Coupling the inner and outer retaining rings to the nozzle chamber main body may comprise welding the inner and outer retaining rings to the nozzle chamber main body.

The process may further comprise machining an outer groove in the nozzle chamber main body and the outer retaining ring and an inner groove in the nozzle chamber main body and the inner retaining ring.

Engaging may comprise slidably engaging an outer flange on the second nozzle block with the outer groove and slidably engaging an inner flange on the second nozzle block with the inner groove.

Forming a bore may comprise drilling an outer bore so as to extend partly in the outer retaining ring and the second nozzle block.

The process may further comprise drilling an inner bore so as to extend partly in the inner retaining ring and the second nozzle block and locating an inner anti-rotation pin in the inner bore.

The process may further comprise drilling portions of a plurality of cooling holes in the inner retaining ring and the nozzle chamber main body.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
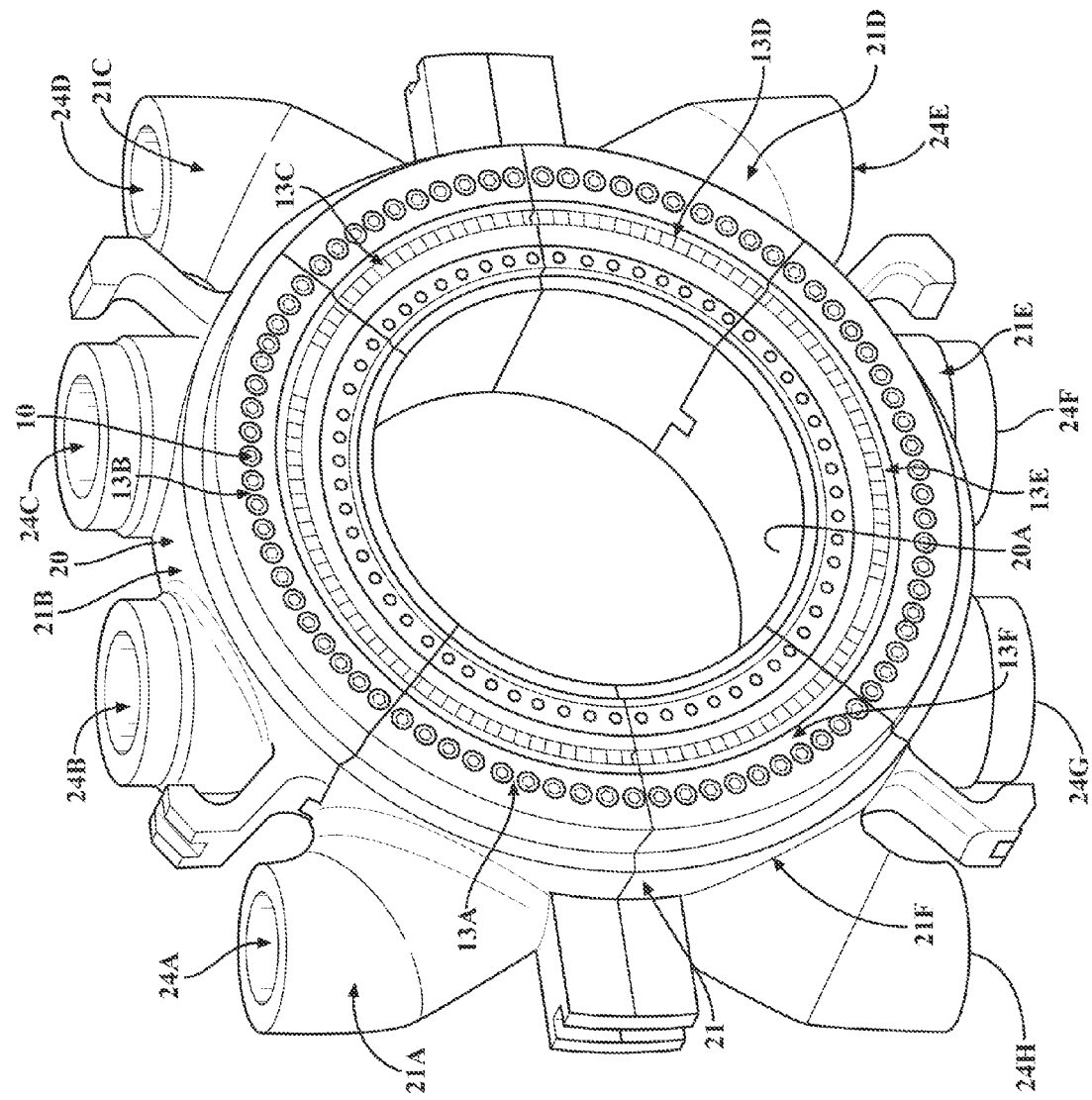
FIG. 1 is a perspective view of a nozzle chamber and nozzle block structure comprising a first nozzle block bolted to the nozzle chamber.

In FIG. 1, a first nozzle block 10 is shown coupled via bolts to a nozzle chamber 20 so as to define a nozzle chamber and nozzle block structure in a steam turbine. In accordance with the present disclosure, a process is provided for replacing the first nozzle block 10 coupled to the nozzle chamber 20, see FIGS. 1 and 2, with a second nozzle block 100, see FIG. 5, where bolts are not used to couple the second nozzle block 100 to the nozzle chamber 20.

Figure 2:
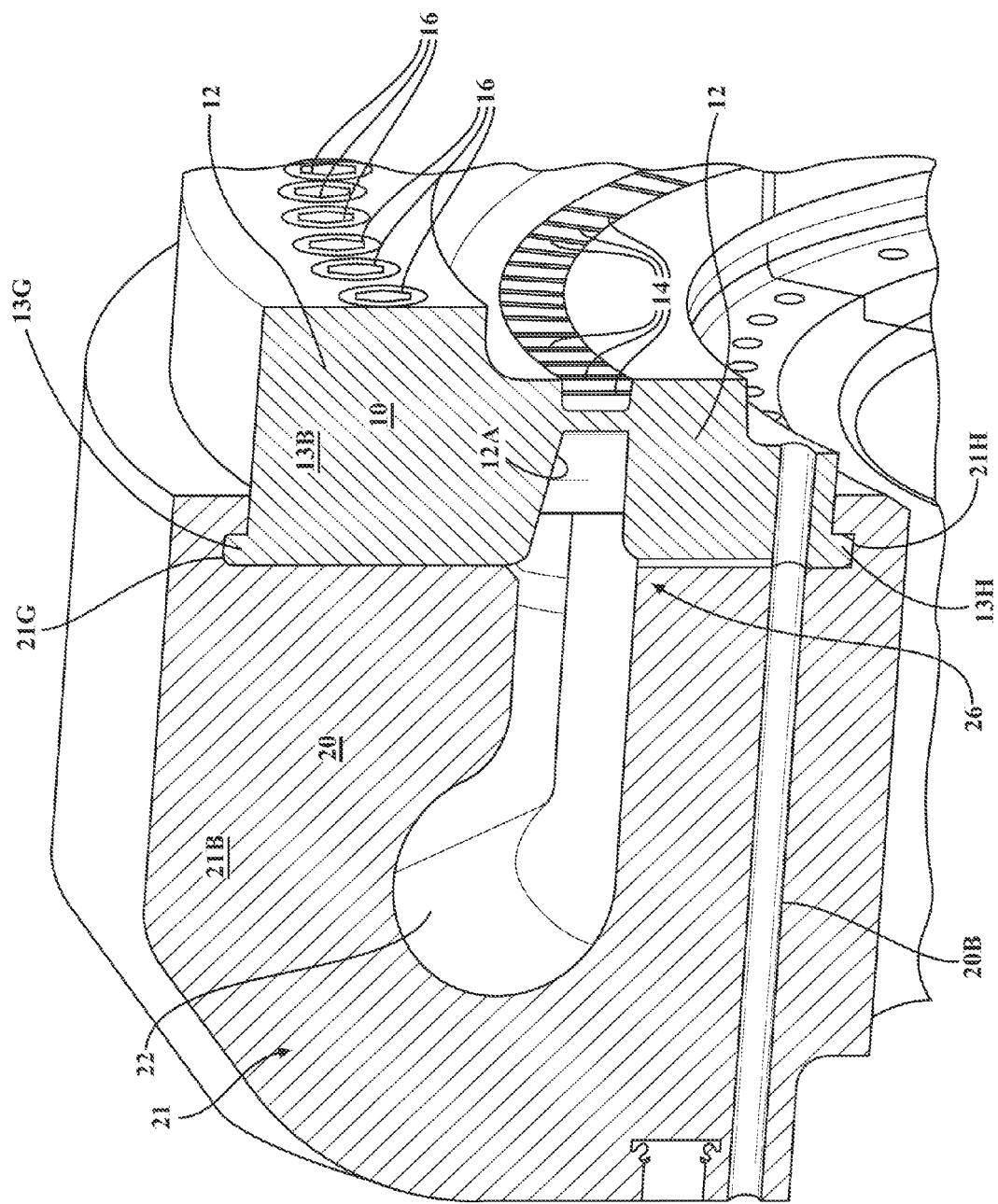
FIG. 2 is a view, partially in cross sectional, taken through the nozzle chamber and nozzle block structure illustrated in FIG. 1.

In the illustrated embodiment, the nozzle chamber 20 comprises a main body 21 defined by six separate sections 21A-21F. The nozzle chamber main body 21 comprises first, second, third, fourth, fifth and six separate passages (only the second passage 22 is illustrated in FIG. 2 spaced-apart from one another circumferentially about the main body 211. The first passage is located within the main body first section 21A and the second, third, fourth, fifth and six passages are respectively provided within the second, third, fourth, fifth and sixth main body sections 21B-21F. The nozzle chamber main body 21 further comprises first, second, third, fourth, fifth, sixth, seventh and eighth steam inlets 24A-24H, which receive steam from a main steam inlet piping structure. The first inlet 24A communicates with and provides steam to the first passage. The second and third inlets 24B and 24C communicate with and provide steam to the second passage 22. The fourth inlet 24D communicates with and provides steam to the third passage. The fifth inlet 24E communicates with and provides steam to the fourth passage. The sixth and seventh inlets 24F and 24G communicate with and provide steam to the fifth passage. The eighth inlet 24H communicates with and provides steam to the sixth passage. The nozzle chamber main body 21 also comprises first, second, third, fourth, fifth and sixth exits (only the second exit 26 is illustrated in FIG. 2). The first passage communicates with the first exit such that steam leaves the first passage via the first exit. The second passage 22 communicates with the second exit 26 such that steam leaves the second passage 22 via the second exit 26. The third, fourth, fifth and sixth passages communicate respectively with the third, fourth, fifth and sixth exits such that steam leaves the third, fourth, fifth and sixth passages respectively via the third, fourth, fifth and sixth exits.

The first nozzle block 10 comprises a support structure 12 comprising a passageway 12A for receiving steam from the first, second, third, fourth, fifth and sixth nozzle chamber main body exits and a plurality of vanes 14 located within the passageway 12A for directing the flow of steam moving through the passageway 12A. In the illustrated embodiment, the support structure 12 is defined by first, second, third, fourth, fifth and sixth sections 13A-13F, see FIG. 1. Each section 13A-13F comprises an upper flange 13G and a lower flange 13H, which are received respectively in first and second grooves 21G and 21H defined in the nozzle chamber main body 21.

The first nozzle block support structure 12 is coupled to the nozzle chamber 20 via a plurality of bolts (not shown), which extend through bolt-receiving bores 16 provided in the support structure 12.

After passing through the passageway 12A, the steam impinges upon a first row of blades located downstream from the nozzle block 10, which blades are coupled to a rotor (not shown). The rotor passes through a central opening 20A in the nozzle chamber 20. The nozzle chamber 20 is fixedly coupled to a static main casing or cylinder in the steam turbine.

As noted above, it is believed to be disadvantageous to couple the first nozzle block 10 to the nozzle chamber 20 via bolts as the bolts may fail.

In accordance with the present disclosure, the first nozzle block 10 is removed from the nozzle chamber 20 and replaced with a second nozzle block 100 that is coupled to the nozzle chamber 20 without the need for using bolts. That process will now be described.

Initially, the bolts coupling the first nozzle block 10 to the nozzle chamber 20 are removed so as to allow the first nozzle block 10 to be removed from the nozzle chamber 20. The nozzle chamber main body first, second and third sections 21A-21C are coupled together via tongue and groove connections so as to define a first 180 degree main body section. The nozzle chamber main body fourth, fifth and sixth sections 21D-21F are coupled together via tongue and groove connections so as to define a second 180 degree main body section. The first and second 180 degree main body sections are separated from one another, which allows a technician to slide out and remove the first, second and third sections 13A-13C of the first nozzle block support structure 12 from the first 180 degree main body section and the fourth, fifth and sixth sections 13D-13F of the first nozzle block support structure 12 from the second 180 degree main body section.

Figure 3:
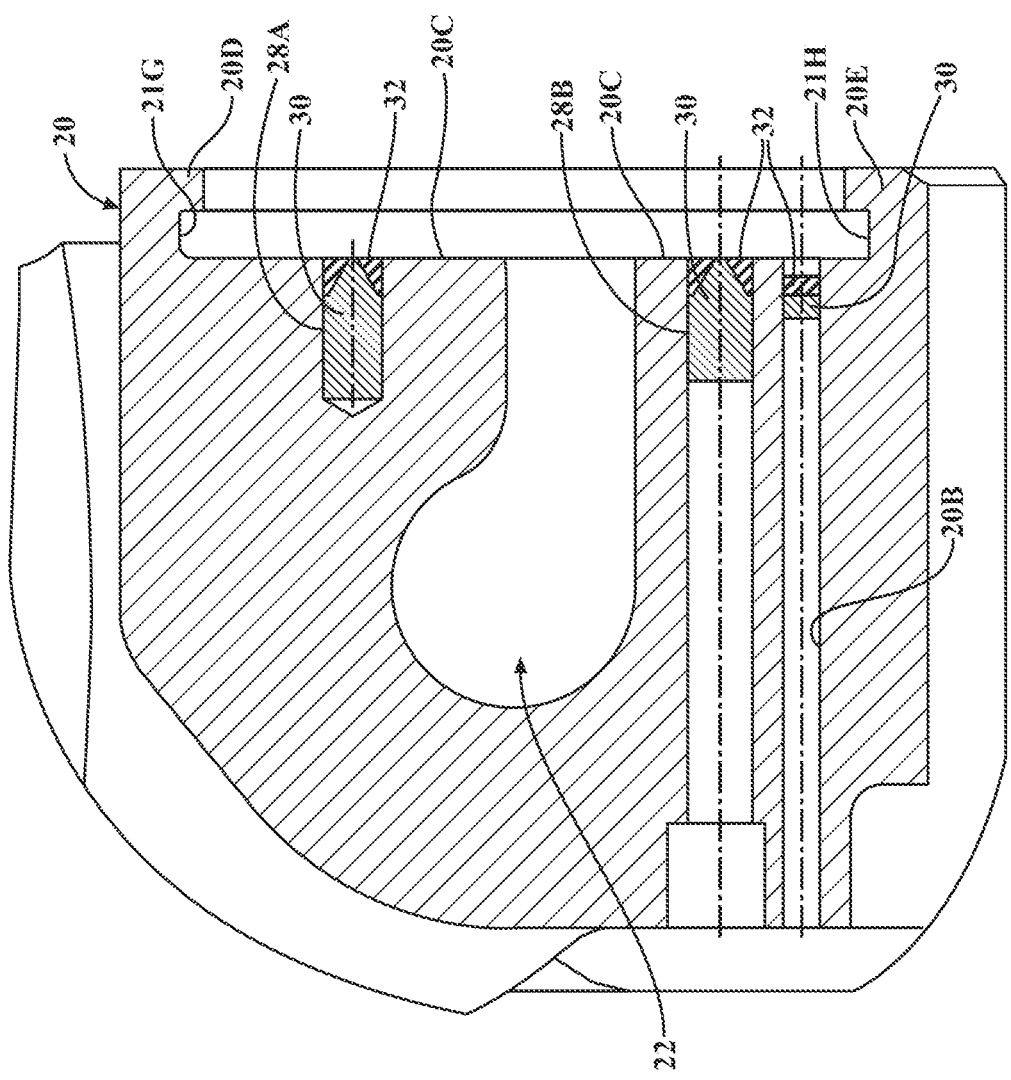
FIG. 3 is a cross sectional view of a portion of the nozzle chamber wherein plugs are shown provided in bolt and cooling holes of the nozzle chamber.

A plurality of threaded bolt holes 28A and 28B are provided in the nozzle chamber 20 for threadedly receiving the bolts, discussed above, for coupling the first nozzle block 10 to the nozzle chamber 20, see FIG. 3. Also, a plurality of circumferentially spaced apart cooling holes 20B are provided in the nozzle chamber 20 through which cooling steam flows, see FIGS. 2 and 3. Plugs 30 are inserted into the bolt and cooling holes 28A, 28B and 20B and, thereafter, welds 32 are formed so as to secure the plugs 30 in position, see FIG. 3.

After the plugs 30 are positioned in the bolt and cooling holes 28A, 28B and 20B, an outer face 20C of the nozzle chamber main body 21 is machined so as to clear the outer face 20C of any excess welding material and make the outer face 20C smooth and generally planar. Further, during the machining process, upper and lower securing hooks 20D and 20E, which define the first and second grooves 21G and 21H in the nozzle chamber main body 21, are removed, see FIGS. 3 and 4.

Figure 4:
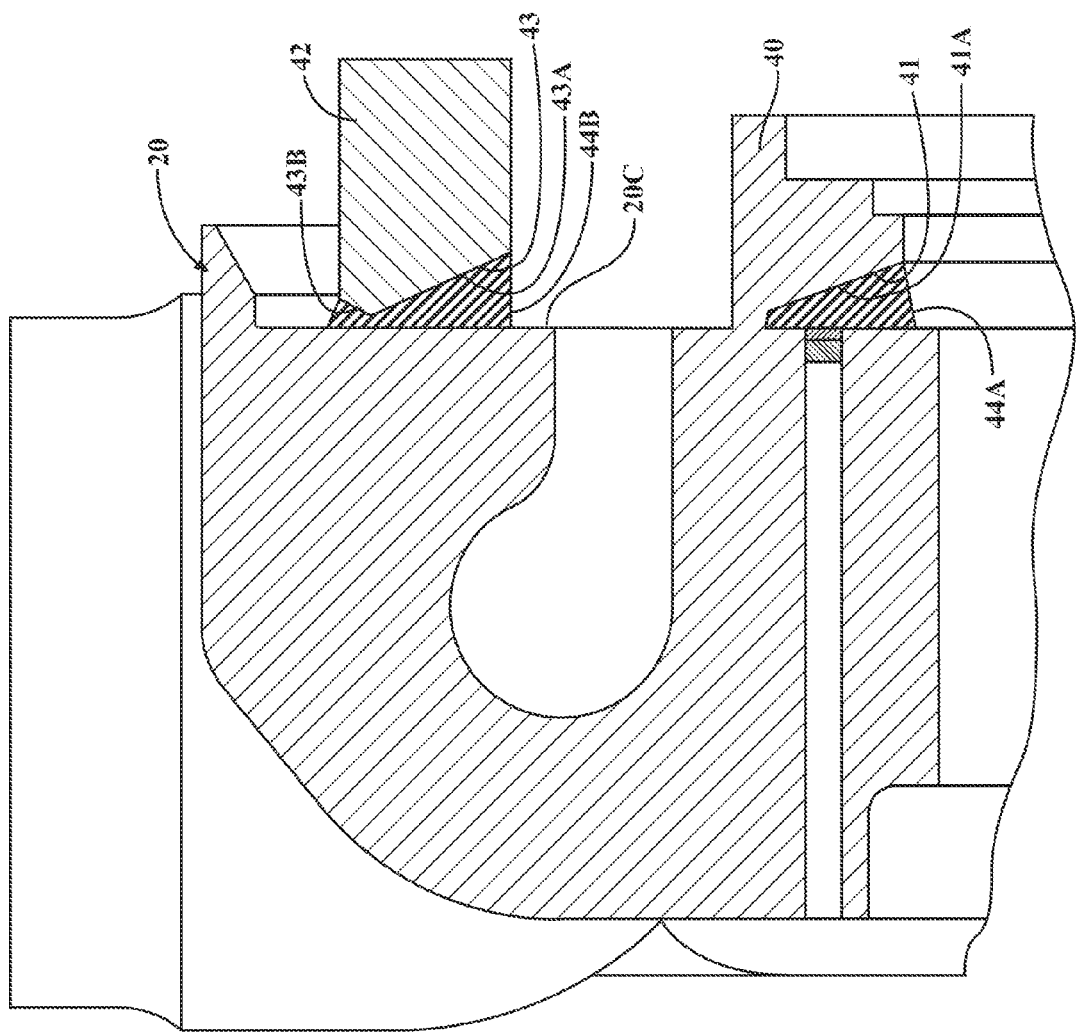
FIG. 4 is a cross sectional view of a portion of the nozzle chamber wherein inner and outer retaining rings are shown welded to the nozzle chamber.

Following the machining operation, inner and outer retaining rings 40 and 42 are welded to the nozzle chamber main body outer face 20C, see FIG. 4. As illustrated in FIG. 4, an inner surface 41 of the inner retaining ring 40 includes an angled section 41A, which is angled and generally non-parallel to the main body outer face 20C in the illustrated embodiment. An inner surface 43 of the outer retaining ring 42 includes first and second angled sections 43A and 43B, which are generally not parallel to the main body outer face 20C in the illustrated embodiment. The angled sections 41A, 43A and 43B allow for easy access of welding tooling between the retaining rings 40 and 42 and the nozzle chamber main body outer face 20C to effect welds between the retaining rings 40 and 42 and the nozzle chamber 20. It is also noted that the upper and lower securing hooks 20D and 20E are removed so as to allow for easy access of the welding tooling between the retaining rings 40 and 42 and the nozzle chamber main body outer face 20C. An inner weld 44A is illustrated in FIG. 4 between the inner retaining ring 40 and the main body outer face 20C and an outer weld 44B is illustrated between the outer retaining ring 42 and the main body outer face 20C. Following the welding operation, a post-weld heat treatment operation is performed.

Figure 5:
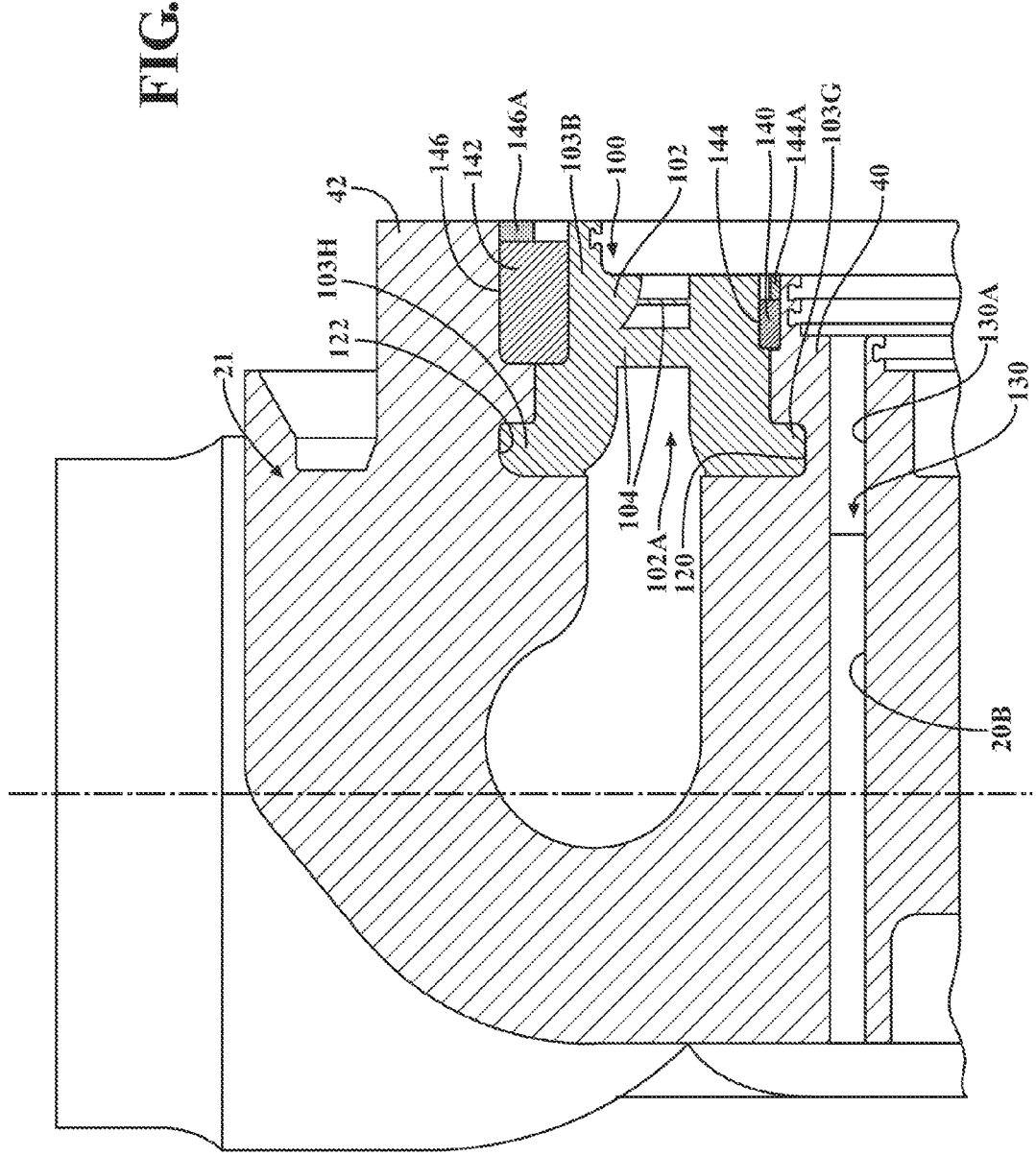
FIG. 5 is a cross sectional view of a portion of the nozzle chamber and a slide-in second nozzle block secured to the nozzle chamber via anti-rotation pins.

Following the welding and heat treatment operations, an inner annular groove 120 is machined into the nozzle chamber main body 21 and the inner retaining ring 40 and an outer annular groove 122 is machined into the nozzle chamber main body 21 and the outer retaining ring 42, see FIG. 5. Further, portions 130A of a plurality of circumferentially spaced apart cooling holes are formed in the inner retaining ring 40 and the nozzle chamber main body 21. These newly machined portions 130A are formed so as to generally align with and have slightly larger diameters than portions of the original cooling holes 20B, which portions did not receive the plugs 30. Hence, the newly machined portions 130A communicate with the original cooling hole portions so as to define a plurality of cooling holes 130, see FIG. 5.

Figure 6:
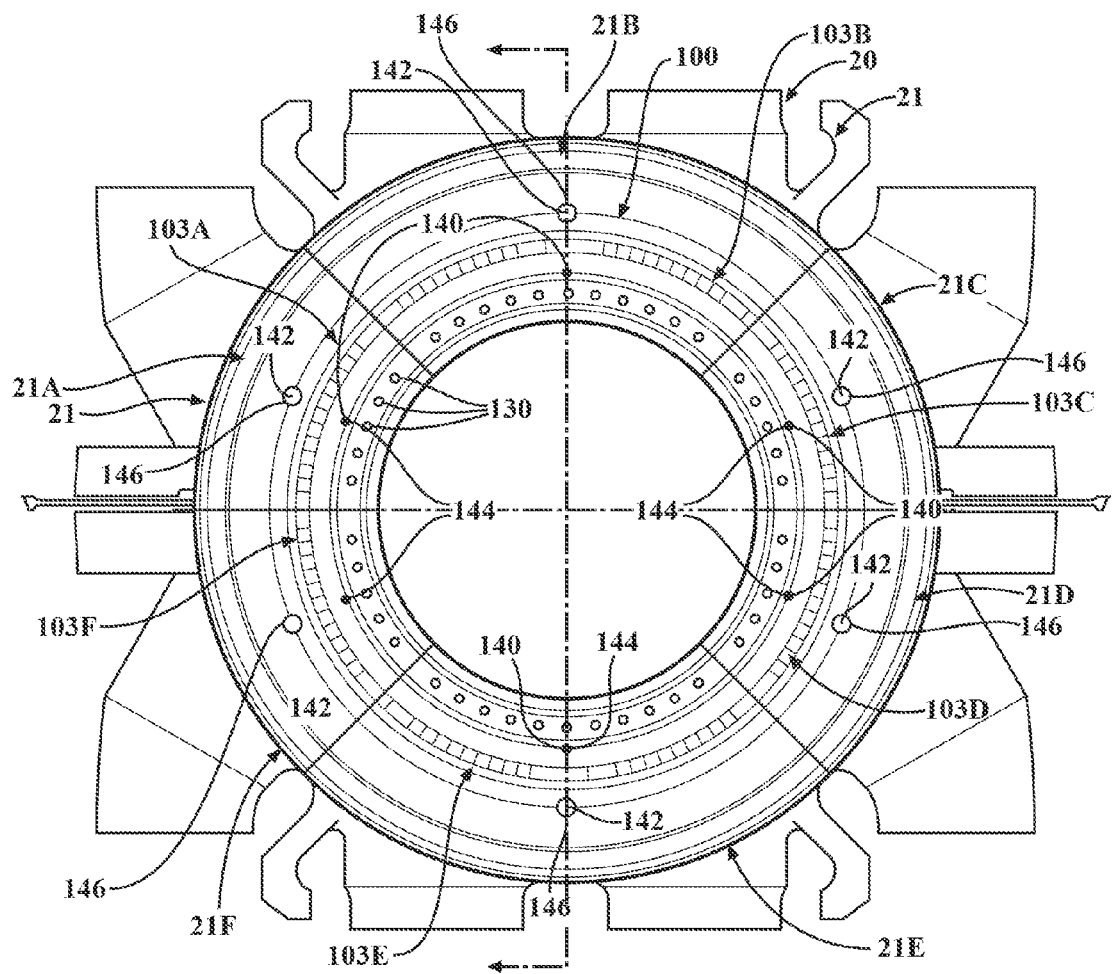
FIG. 6 is a generally front view of the nozzle chamber and the second nozzle block coupled together defining a modified nozzle chamber and nozzle block structure.

The next step involves assembling the second nozzle block 100 with the nozzle chamber 20. The second nozzle block 100 comprises a support structure 102 comprising a passageway 102A for receiving steam from the first, second, third, fourth, fifth and sixth nozzle chamber main body exits and a plurality of vanes 104 located within the passageway 102A for directing the flow of steam moving through the passageway 102A. In the illustrated embodiment, the support structure 102 is defined by first, second, third, fourth, fifth and sixth sections 103A-103F, see FIG. 6. Each section 103A-103F comprises a lower flange 103G and an upper flange 103H, which are received respectively in the inner and outer annular grooves 120 and 122 defined in the nozzle chamber main body 21 and the inner and outer retaining rings 40 and 42, see FIG. 5.

As noted above, the nozzle chamber main body first, second and third sections 21A-21C are coupled together via tongue and groove connections so as to define a first 180 degree main body section and the nozzle chamber main body fourth, fifth and sixth sections 21D-21F are coupled together via tongue and groove connections so as to define a second 180 degree main body section. With the first and second 180 degree main body sections separated from one another, the first, second and third sections 103A-103C of the second nozzle block support structure 102 are coupled to the first 180 degree main body section by sliding the lower and upper flanges 103G and 103H of these sections 103A-103C into the inner and outer annular grooves 122 and 124 formed in the first 180 degree main body section. In a similar manner, the fourth, fifth and sixth sections 103D-103F of the second nozzle block support structure 102 are coupled to the second 180 degree main body section by sliding the lower and upper flanges 103G and 103H of these sections 103D-103F into the inner and outer annular grooves 122 and 124 formed in the second 180 degree main body section. The first and second 180 degree main body sections are then positioned adjacent and opposite to one another such that the first, second, third, fourth, fifth and sixth sections 103A-103F define a generally annular second nozzle block 100 coupled to the nozzle chamber 20.

The steam passing through the second nozzle block passageway 102A applies forces to the vanes 104 having a circumferential force component. So as to prevent circumferential movement of the second nozzle block 100, inner and outer anti-rotation pins 140 and 142 are provided in inner and outer bores 144 and 146 extending into the second nozzle block support structure 102 and the inner and outer retaining rings 40 and 42. More specifically, a plurality of circumferentially spaced apart inner bores 144 are formed so as to extend partly in the second nozzle block support structure 102 and the inner retaining ring 40, see FIGS. 5 and 6. Further, a plurality of circumferentially spaced apart outer bores 146 are formed so as to extend partly in the second nozzle block support structure 102 and the outer retaining ring 42, see FIGS. 5 and 6. The inner rotation pins 140 are then positioned in the inner bores 144 and the outer rotation pins 142 are positioned in the outer bores 146. Once the anti-rotation pins 140 and 142 are positioned in the bores 144 and 146, welds 144A and 146A may be formed between the pins 140 and 142 and the inner and outer retaining rings 40 and 42 so as to secure the pins 140 and 142 in position.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for replacing a
  first nozzle block coupled to a nozzle chamber with a second nozzle block comprising:
  removing the first nozzle block from the nozzle chamber, the nozzle chamber comprising a main body having at least one inlet, at least one passage and at least one exit;
  coupling inner and outer retaining rings to the nozzle chamber main body;
  engaging the second nozzle block with the inner and outer retaining rings so as to couple the second nozzle block to the nozzle chamber main body;
  forming a bore so as to extend partly in one of the inner and outer retaining rings and partly in the second nozzle block; and
  locating an anti-rotation pin in the bore,
  providing plugs in existing bolt holes in the nozzle chamber main body and securing these plugs via welding,
  wherein the removing comprises removing bolts coupling the first nozzle block to the nozzle chamber.

2. The process as set out in claim 1, further comprising machining an outer face of said nozzle chamber main body, wherein said removing occurs before said plugging and said plugging occurs before said machining.

3. The process as set out in claim 2, wherein said machining further comprises removing existing outer securing hooks on the nozzle chamber main body.

4. The process as set out in claim 2, wherein coupling the inner and outer retaining rings to the nozzle chamber main body comprises welding the inner and outer retaining rings to the nozzle chamber main body.

5. The process as set out in claim 1, wherein forming a bore comprises drilling an outer bore so as to extend partly in the outer retaining ring and the second nozzle block.

6. The process as set out in claim 5, further comprising drilling an inner bore so as to extend partly in the inner retaining ring and the second nozzle block and locating a further anti-rotation pin in the inner bore.

7. A process for replacing a first nozzle block coupled to a nozzle chamber with a second nozzle block comprising:
  removing the first nozzle block from the nozzle chamber, the nozzle chamber comprising a main body having at least one inlet, at least one passage and at least one exit;
  coupling inner and outer retaining rings to the nozzle chamber main body;

engaging the second nozzle block with the inner and outer retaining rings so as to couple the second nozzle block to the nozzle chamber main body;

forming a bore so as to extend partly in one of the inner and outer retaining rings and partly in the second nozzle block; and locating an anti-rotation pin in the bore, machining an outer groove in the nozzle chamber main body and the outer retaining ring and machining an inner groove in the nozzle chamber main body and the inner retaining ring.

8. The process as set out in claim 7, wherein said engaging comprises slidably engaging an outer flange on the second nozzle block with the outer groove and slidably engaging an inner flange on the second nozzle block with the inner groove.

9. A process for replacing a first nozzle block coupled to a nozzle chamber with a second nozzle block comprising:

removing the first nozzle block from the nozzle chamber, the nozzle chamber comprising a main body having at least one inlet, at least one passage and at least one exit;

coupling inner and outer retaining rings to the nozzle chamber main body;

engaging the second nozzle block with the inner and outer retaining rings so as to couple the second nozzle block to the nozzle chamber main body;

forming a bore so as to extend partly in one of the inner and outer retaining rings and partly in the second nozzle block; and locating an anti-rotation pin in the bore; and drilling portions of a plurality of cooling holes in said inner retaining ring and said nozzle chamber main body.

\* \* \* \* \*